US008885202B2

(12) United States Patent  
Shindoh

(10) Patent No.: US 8,885,202 B2  
(45) Date of Patent: Nov. 11, 2014

(54) IMAGE FORMING APPARATUS HAVING ENGINE TO AQUIRE STORAGE REGION WHERE IMAGE DATA IS TO BE WRITTEN, AND MEMORY CONTROL METHOD USING THE SAME

(75) Inventor: Hidenori Shindoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1343 days.

(21) Appl. No.: 12/492,233

(22) Filed: Jun. 26, 2009

(65) Prior Publication Data

US 2010/0002263 A1 Jan. 7, 2010

(30) Foreign Application Priority Data

Jul. 2, 2008 (JP) ................... 2008-173504

(51) Int. Cl.
*G06K 15/02* (2006.01)
*H04N 1/32* (2006.01)
*G06F 12/00* (2006.01)

(52) U.S. Cl.
CPC ....... *H04N 1/32358* (2013.01); *H04N 1/32443* (2013.01); *H04N 2201/0094* (2013.01)
USPC .......... 358/1.16; 358/1.13; 358/1.17; 710/52; 710/74; 711/170; 711/162; 711/153; 711/112; 711/103

(58) Field of Classification Search
None
See application file for complete search history.

(56) References Cited

U.S. PATENT DOCUMENTS

| | | | | |
|---|---|---|---|---|
| 5,537,218 A | * | 7/1996 | Negi | ............................. 358/404 |
| 6,925,544 B2 | * | 8/2005 | Gresham | ...................... 711/170 |
| 7,283,380 B1 | * | 10/2007 | Srinivasan et al. | ......... 365/49.17 |
| 7,301,653 B2 | | 11/2007 | Shindoh | |
| 7,515,293 B2 | | 4/2009 | Kizaki et al. | |
| 7,680,980 B2 | * | 3/2010 | Takato | .......................... 711/112 |
| 7,849,357 B2 | * | 12/2010 | Nakano | ......................... 714/6.13 |
| 8,176,263 B2 | * | 5/2012 | Yamada et al. | ................. 711/147 |
| 2002/0047850 A1 | * | 4/2002 | Yoshioka | ...................... 345/600 |
| 2002/0184436 A1 | * | 12/2002 | Kim et al. | ...................... 711/103 |
| 2004/0109186 A1 | * | 6/2004 | Shindoh et al. | .............. 358/1.13 |
| 2004/0114171 A1 | | 6/2004 | Shindoh et al. | |
| 2004/0136022 A1 | | 7/2004 | Kizaki et al. | |
| 2004/0158636 A1 | * | 8/2004 | Nakagawa et al. | ........... 709/226 |
| 2004/0233466 A1 | | 11/2004 | Shindoh et al. | |
| 2005/0119987 A1 | * | 6/2005 | Kay et al. | .......................... 707/1 |
| 2005/0157322 A1 | | 7/2005 | Kizaki et al. | |
| 2005/0174675 A1 | | 8/2005 | Hattori et al. | |

(Continued)

FOREIGN PATENT DOCUMENTS

JP 05-007271 1/1993
JP 3730586 1/2006

OTHER PUBLICATIONS

Japanese Office Action dated Apr. 24, 2012.

*Primary Examiner* — Marcus T Riley
*Assistant Examiner* — Pawandeep Dhingra
(74) *Attorney, Agent, or Firm* — IPUSA, PLLC

(57) ABSTRACT

An image forming apparatus has a read unit to read a document image and generate image data of the document image, a memory management unit to manage a storage unit which is segmented into storage regions, and an engine to write the image data generated by the read unit to the storage unit. The engine acquires setting information related to writing of the image data from the memory management unit, and writes the image data to the storage unit based on the setting information that is acquired.

15 Claims, 11 Drawing Sheets

(56) References Cited

U.S. PATENT DOCUMENTS

| | | | |
|---|---|---|---|
| 2007/0076256 A1* | 4/2007 | Yamamoto et al. | 358/1.16 |
| 2007/0156998 A1* | 7/2007 | Gorobets | 711/170 |
| 2008/0077741 A1* | 3/2008 | Yasui et al. | 711/129 |
| 2008/0098161 A1* | 4/2008 | Ito | 711/103 |
| 2008/0320243 A1* | 12/2008 | Mitsuzuka et al. | 711/153 |
| 2010/0077163 A1* | 3/2010 | Ugawa et al. | 711/162 |

* cited by examiner

FIG.10

| | ABNORMAL CONDITIONS |
|---|---|
| CONDITION C1 | NEXT BACKUP REQUEST IS RECEIVED BEFORE DATA BACKUP ENDS FOR EACH COLOR |
| CONDITION C2 | BACKUP REQUEST OF AN IMMEDIATELY PRECEDING STORAGE REGION IS RECEIVED BEFORE DATA BACKUP ENDS FOR EACH COLOR |

IMAGE FORMING APPARATUS HAVING ENGINE TO AQUIRE STORAGE REGION WHERE IMAGE DATA IS TO BE WRITTEN, AND MEMORY CONTROL METHOD USING THE SAME

BACKGROUND OF THE INVENTION

1. Field of the Invention

The present invention relates to image forming apparatuses and memory control methods.

2. Description of the Related Art

Conventionally, there were demands to print a large image such as a design drawing, a blue print or a poster having a large impact. But recently, there are also demands to improve the picture quality (or image quality). Hence, the picture quality obtained by a printer which prints the large image must not be deteriorated compared to the picture quality obtainable by the popularly used printers which can print on a medium having a size of up to A3 size, for example. In addition, there are market demands to use color printers.

On the other hand, a Japanese Patent No. 3730586 proposed a mechanism that enables an engine to directly write image data to a memory.

According to this proposed mechanism, two toggle buffers are used to alternately input the image data, to form an image forming apparatus (or a MFP: Multi-Function Peripheral) which inputs the image data using a small amount of memory space.

Furthermore, because the circuit scale and the development cost increase when the conventional Application Specific Integrated Circuit (ASIC) input system is employed for the color printing, there are demands to realize a mechanism which enables the engine to directly write the color image data to the memory.

However, in the case of the image data related to a long image, a large amount of image data is repeatedly input to the memory, and the input image data needs to be backed up (or saved) in a Hard Disk Drive (HDD) or the like at all times. In the case of a monochromatic image data, there only are one input path and one backup path, and the timings need only be adjusted between the two paths. However, in the case of the color image data, there are a plurality of input paths for the cyan (C), magenta (M), yellow (Y) and black (K) image data or, red (R), green (G) and blue (B) image data, while there is only one backup path. For this reason, the color image data cannot be backed up efficiently by merely adjusting the timings between the backup path and the plurality of input paths.

In addition, when the engine repeatedly writes the image data to the memory, the mere use of the two toggle buffers as in the case of the proposed mechanism described above cannot flexibly cope with general applications.

SUMMARY OF THE INVENTION

Accordingly, it is a general object of the present invention to provide a novel and useful image forming apparatus and memory control method, in which the problems described above are suppressed.

Another and more specific object in one aspect of the present invention is to provide an image forming apparatus and a memory control method, in which an engine automatically acquires a storage region of a memory where the image data is to be written in order to efficiently utilize the memory, even when the image data is related to a long image or a color image.

According to one aspect of the present invention, there is provided an image forming apparatus comprising a read unit configured to read a document image and to generate image data of the document image; a memory management unit configured to manage a first storage unit which is segmented into a plurality of storage regions; and an engine configured to write the image data generated by the read unit to the first storage unit, wherein the engine acquires setting information related to writing of the image data from the memory management unit, and writes the image data to the first storage unit based on the setting information that is acquired.

According to one aspect of the present invention, there is provided a memory control method for an image forming apparatus comprising a read unit configured to read a document image and to generate image data of the document image, a memory management unit configured to manage a first storage unit which is segmented into a plurality of storage regions, and an engine configured to write the image data generated by the read unit to the first storage unit, the memory control method comprising acquiring, by the engine, setting information related to writing of the image data from the memory management unit; and writing, by the engine, the image data to the first storage unit based on the setting information that is acquired.

According to one aspect of the present invention, there is provided a computer-readable storage medium on which a program which, when executed by a computer, causes the computer to perform a process comprising reading a document image and generating image data of the document image; managing a first storage unit which is segmented into a plurality of storage regions; and writing the image data generated by the reading to the first storage unit, wherein the writing acquires setting information related to writing of the image data from the managing, and writes the image data to the first storage unit based on the setting information that is acquired.

Other objects and further features of the present invention will be apparent from the following detailed description when read in conjunction with the accompanying drawings.

BRIEF DESCRIPTION OF THE DRAWINGS

FIG. 10 is a diagram showing an example of an abnormal condition table; and

DESCRIPTION OF THE PREFERRED EMBODIMENTS

Figure 1:
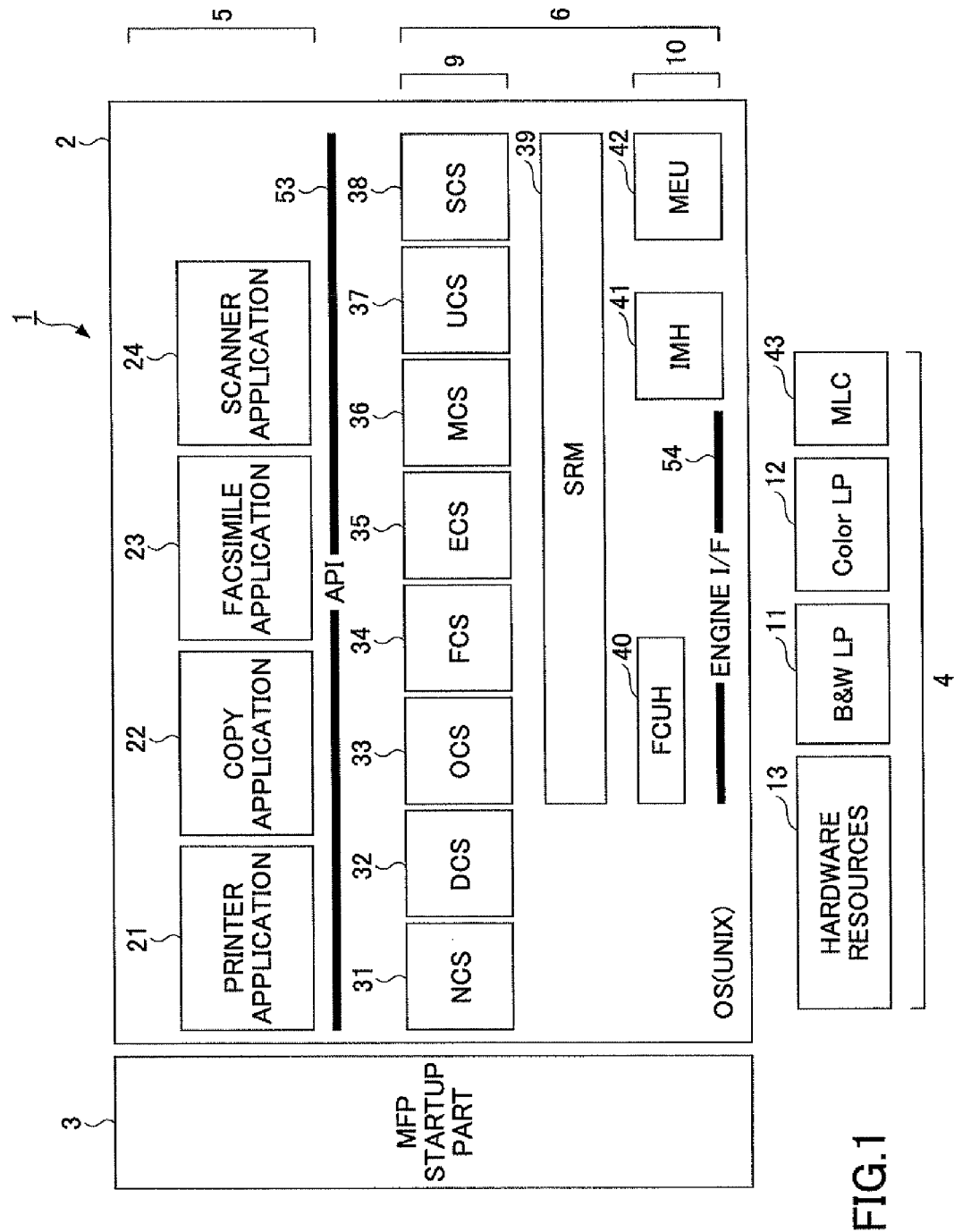
FIG. 1 is a diagram showing a structure of a MFP in an embodiment of the present invention.

A description will be given of embodiments of the image forming apparatus and the memory control method according to the present invention, by referring to the drawings.

First Embodiment

FIG. 1 is a diagram showing a structure of a MFP in an embodiment of the present invention. The MFP 1 includes a software group 2, a MFP startup (or booting) part 3, and hardware resources 4.

The MFP startup part 3 is executed first when power is supplied to the MFP 1, in order to start an application layer 5 and a platform layer 6. For example, the MFP startup part 3 reads programs of the application layer 5 and the platform layer 6 from a HDD, and transfers the read programs to a storage region to start the programs.

The hardware resources 4 include a black-and-white laser printer (B & L LP) 11, a color laser printer (Color LP) 12, a hardware resource 13 such as a scanner or a facsimile apparatus, and an image conversion hardware (MLC: Multi-Level-Cell) 43.

In additions the software group 2 includes the application layer 5 and the platform layer 6 which are started in an Operating System (OS) such as the UNIX (registered trademark). The application layer 5 includes programs for carrying out processes unique to user services related to the image formation, such as printer, copy, facsimile and scanner services.

The application layer 5 includes a printer application 21, a copy application 22, a facsimile application 23, and a scanner application 24.

On the other hand, the platform layer 6 includes a control service layer 9 that interprets a process request from the application layer 5 and generates an acquisition request for the hardware resources 4, a System Resource Manager (SRM) 39 that manages one or more hardware resources 4 and carries out an arbitration of the acquisition request from the control service layer 9, and a handler layer 10 that manages the hardware resources 4 depending on the acquisition request from the SRM 39.

The control service layer 9 includes a Network Control Service (NCS) 31, a Delivery Control Service (DCS) 32, an Operation Control Service (OCS) 33, a Facsimile Control Service (FCS) 34, an Engine Control Service (ECS) 35, a Memory Control Service (MCS) 36, a User Control Service (UCS) 37, and a System Control Service (SCS) 38. In other words, the control service layer 9 includes one or more service modules.

The platform layer 6 is configured to include an Application Program Interface (API) 53 capable of receiving a process request from the application layer 5, by a predefined function. The OS executes each software of the application layer 5 and the platform layer 6 in parallel as processes.

The process of the NCS 31 provides a service that can be used in common with respect to the applications requiring a network Input and Output (I/O). The process of the NCS 31 distributes the data received from the network by each protocol to each of the applications, and intermediates when transmitting the data from each of the applications to the network.

For example, the NCS 31 controls the data communication between the MFP 1 and a network equipment via the network which connects the MFP 1 and the network equipment according to the HyperText Transfer Protocol (HTTP), by a HyperText Transfer Protocol Daemon (httpd).

The process of the DCS 32 controls the distribution of stored documents and the like. The process of the OCS 33 controls an operation panel which functions as an information transfer unit (or information transfer means) between the operator and the main control. The process of the FCS 34 provides an API for making a facsimile transmission or reception using a Public Switched Telephone Network (PSTN) or an Integrated Services Digital Network (ISDN) from the application layer 5, registering or referring to various facsimile data managed in a backup memory, reading facsimile data, and receiving and printing facsimile data.

The process of the ECS 35 controls an engine part such as the black-and-white laser printer 11, the color laser printer 12 and the hardware resources 13. The process of the MCS 36 carries out a memory control such as acquiring and releasing the memory and utilizing the HDD. The process of the UCS 37 manages user information.

The process of the SCS 38 carries out application management, operation part control, system screen display, Light Emitting Diode (LED) display, hardware resource management, interrupt application control and the like.

The process of the SRM 39 carries out a system control and the management of the hardware resources 4, together with the SCS 38. For example, the process of the SRM 39 carries out an arbitration according to the acquisition requests from the upper layers which utilize the hardware resources 4 such as the black-and-white laser printer 11 and the color laser printer 12, and controls the execution of the acquisition requests.

More particularly, the process of the SRM 39 judges whether the hardware resources 4 requested by the acquisition request can be utilized (that is, the requested hardware resources 4 are not being utilized by another acquisition request), and notifies the upper layer that the hardware resources 4 requested by the acquisition request can be utilized if the requested hardware resources 4 can be utilized. In addition, the process of the SRM 39 carries out a scheduling for utilizing the hardware resources 4 with respect to the acquisition request from the upper layer, and directly carries out the requested contents, such as a recording medium (or paper) transport operation and an image forming operation by the printer engine, a memory securing operation, and a file generating operation.

In addition, the handler layer 10 includes a Facsimile Control Unit Handler (FCUH) 40 that manages a Facsimile Control Unit (FCU) which will be described later, and an Image Memory Handler (IMH) 41 that manages the allocation of the memory with respect to the processes and the memory allocated to the processes. A Media Edit Utility (MEU) 42 controls the MLC 43, and converts a format (or internal format) used within the MFP 1 into a general-purpose (or, all-purpose or universal) format.

The SRM 39 and the FCUH 40 utilizes an engine interface (I/F) 54 which enables transmission of the process request with respect to the hardware resources 4 by a predefined function, and carries out the process request with respect to the hardware resources 4.

The MFP 1 can centrally carry out the processing of the processes that are required in common by each of the applications in the platform layer 6. Next, a description will be given of a hardware structure of the MFP 1.

Figure 2:
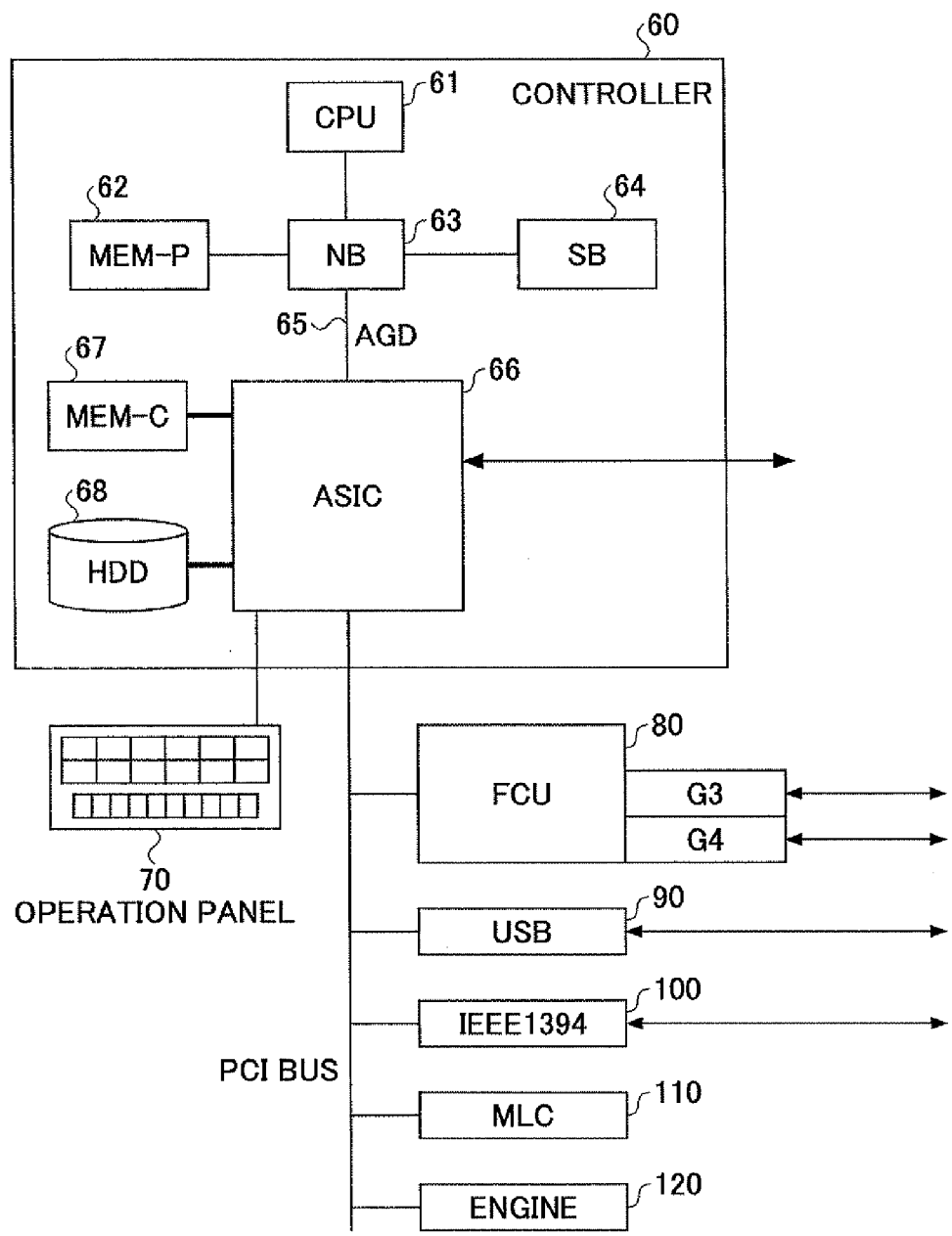
FIG. 2 is a diagram showing a hardware structure of the MFP in the embodiment.

FIG. 2 is a diagram showing the hardware structure of the MFP 1 in this embodiment. As shown in FIG. 2, the MFP 1 includes a controller 60, an operation panel 70, a Facsimile Control Unit (FCU) 80, a Universal Serial Bus (USB) device 90, an IEEE 1394 device 100, a Multi-Level-Cell (MLC) 110, and an engine 120.

The controller 60 includes a Central Processing Unit (CPU) 61, an ASIC 66, a HDD 68, a system memory (MEMP) 62, a local memory (MEM-C) 67, a North Bridge (NB) 63, and a South Bridge (SB) 64.

The operation panel 70 is connected to the ASIC 66 of the controller 60. In addition, the FCU 80, the USB device 90, the IEEE 1394 device 100, the MLC 110 and the engine (including scanner and plotter engines) 120 are connected to the ASIC 66 of the controller 60 via a Peripheral Components Interconnect (PCI) bus. The FCU 80 includes a G-3 standard unit which is in conformance with the G-3 standards prescribed by the International Telecommunication Union-Telecommunication sector (ITU-T), and a G-4 standard unit which is in conformance with the G-4 standards prescribed by the ITU-T.

In the controller 60, the local memory 67 and the HDD 68 are connected to the ASIC 66, and the CPU 61 and the ASIC 66 are connected via the NB 63 which forms a CPU chip set. By connecting the CPU 61 and the ASIC 66 via the NB 63, it becomes possible to cope with a situation where the interface of the CPU 61 is not made public.

The ASIC 66 and the NB 63 are not connected via a PCI bus, but are connected via an Accelerated Graphics Port (AGP) 65. In order to execute and control one or more processes forming the application layer 5 or the platform layer 6 shown in FIG. 1, the ASIC 66 and the NB 63 are not connected via a low-speed PCI bus and are connected via the AGP 65 to prevent the performance from deteriorating.

The CPU 61 controls the general operation of the MFP 1. The CPU 61 starts and executes the NCS 31, the DCS 32, the OCS 33, the FCS 34, the ECS 35, the MCS 36, the UCS 37, the SCS 38, the SRM 39, the FCUH 40, the IMH 41 and the MEU 42 on the OS as processes, and starts and executes the printer application 21, the copy application 22, the facsimile application 23 and the scanner application 24 that form the application layer 5.

The NB 63 connects the CPU 61, the system memory 62, the SB 64 and the ASIC 66. The system memory 62 is used as a plotter memory or the like of the MFP 1. The SB 64 connects the NB 63 to a Read Only Memory (ROM), a PCI bus and peripheral devices. The local memory 67 is used as a copy image buffer, a code buffer or the like.

The ASIC 66 is for use by an image processing, and includes hardware elements for image processing. The HDD 68 forms a storage unit for storing images (or image data), document data, programs, font data, forms or the like. The operation panel 70 accepts an input operation made by the operator (or user), and makes a display with respect to the operator.

An image read request is generated by the copy application 22, the facsimile application 23 and the scanner application 24, and the image is read by utilizing the hardware resources 4 via the platform layer 6. The read image (or image data) is stored in the system memory 62 or the local memory 67 shown in FIG. 2. Next, a more detailed description will be given of the image read operation by taking a copy operation as an example.

In order to read the image, the operator first sets a document on a scanner part of the engine 120 of the MFP 1 (or image forming apparatus). The operator instructs copy conditions from the operation panel 70, and starts a scan operation by pushing a start key of the operation panel 70.

Figure 3:
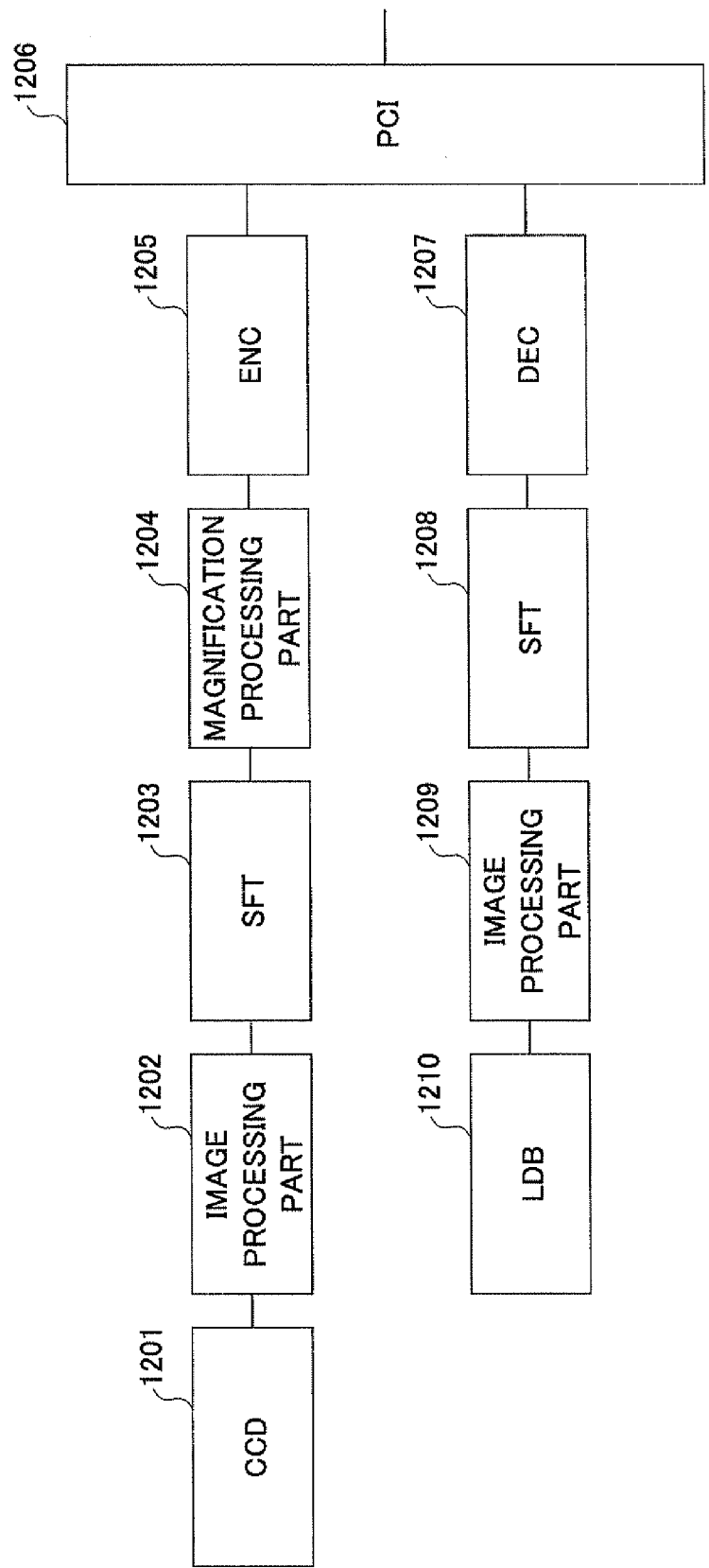
FIG. 3 is a diagram showing an example of a structure of an engine.

The controller 60 receives a copy start instruction which is issued in response to the pushing of the start key of the operation panel 70. The CPU 60 instructs the engine 120 to start a scan via the PCI bus, in response to the copy start instruction. A description will now be given of a structure of the engine 120, by referring to FIG. 3. In FIG. 3, an illustration of a medium (or paper) transport part is omitted.

FIG. 3 is a diagram showing an example of the structure of the engine 120. The document image is read by a Charge Coupled Device (CCD) 1201, and a read analog signal is passed through an input image processing part 1202 which subjects the analog signal to image processes such as an analog-to-digital (A/D) conversion, a shading correction, a Modulation Transfer Factor (MTF) correction, and a gamma-correction (γ-correction). The image data obtained by the image processes in the image processing part 1202 is supplied to an image shifting part (SFT) 1203 which subjects the image data to a shifting process in a main scan direction.

The image data subjected to the shifting process in the image shifting part 1203 is passed through a magnification (or zoom) processing part 1204 which carries out a magnification (or zoom) process such as an enlargement or a reduction at a magnification (or zoom) specified by the operator. The multi-level image data subjected to the magnification process in the magnification part 1204 is converted into code data (or encoded data) by a compressor (or encoder, ENC) 1205. A PCI part 1206, which is formed by a part configured to execute a PCI bus protocol and a Direct Memory Access Controller (DMAC), stores the codes in the system memory 62 or the local memory 67 via the ASIC 66 of the controller 60.

Next, a description will be given of a print output process. When the reading of the image (or image data) into the system memory 62 or the local memory 67 ends, the controller 60 issues an output instruction with respect to the engine 120. The engine 120 attempts to read the image data from the controller 60 via the PCI part 1206 and the PCI bus, in response to the output instruction.

In other words, the engine 120 generates a read transaction, and issues a read request with respect to the ASIC 66. The ASIC 66 reads the image data from the system memory 62 or the local memory 67 in response to the read request, and supplies the read image data to the engine 120.

When the PCI part 1206 of the engine 120 receives the image data from the controller 60, the image data (or code data) is expanded (or decoded) back into the original multi-level image data in an expanding part (or decoder, DEC) 1207. The multi-level image data obtained from the expanding part 1207 is subjected to a shifting process in an image shifting part (SFT) 1208 in order to output image data.

The image data subjected to the shifting process in the image shifting part 1208 is supplied to a Laser Driver Board (LDB) 1210 for plotting the image of the image data on a photoconductive body (not shown), via an output image processing part 1209. The LDB 1210, which is provided at the last stage, transfers, develops and fixes the image of the image data on a recording medium (or paper), and the recording medium having the image printed thereon is output to an eject tray (not shown).

Figure 4:
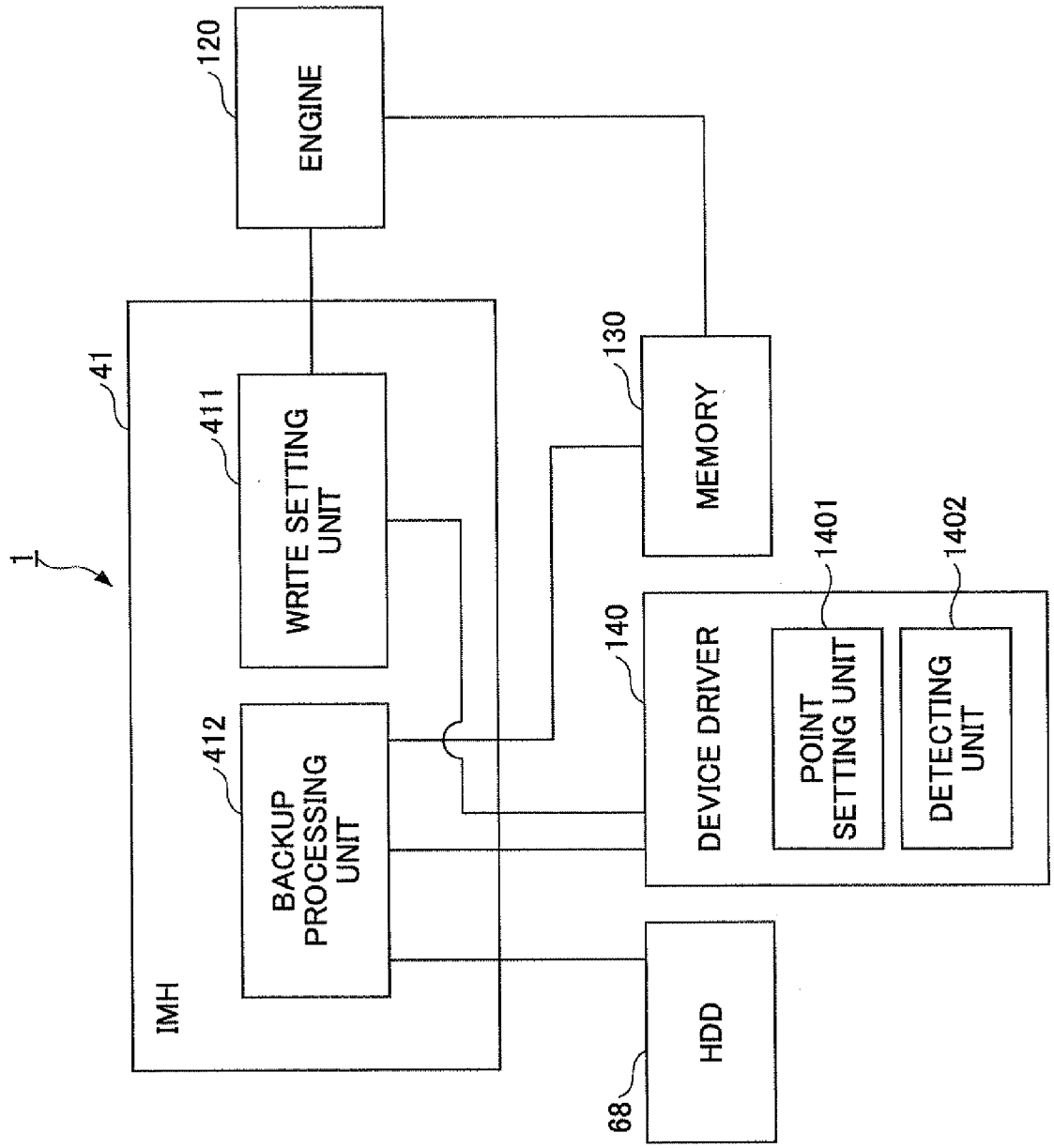
FIG. 4 is a block diagram showing functions of the MFP in the embodiment.

FIG. 4 is a block diagram showing functions of the MFP 1 in this embodiment. As shown in FIG. 4, the MFP 1 includes an IMH 41, an engine 120, a memory 130, a device driver 140, and a HDD 68.

The IMH 41 includes a write setting unit (or write setting means) 411 and a backup processing unit (or backup processing means) 412. The write setting unit 412 acquires a storage region (or memory region) of the memory 130 (system memory 62 or local memory 67) in response to an acquisition request from the application layer 5, and sets a write mode (or write rule) with which the image data is to be written to the memory 130. Then, the write setting unit 411 outputs to the engine 120 a pointer that is written with setting information related to the writing of the image data to the memory 130.

The engine 120 reads the setting information from the pointer that is acquired from the write setting unit 411, and interprets the read setting information. The engine 120 writes the image data into the memory 130 according to write setting values that are set in the interpreted setting information.

Figure 5:
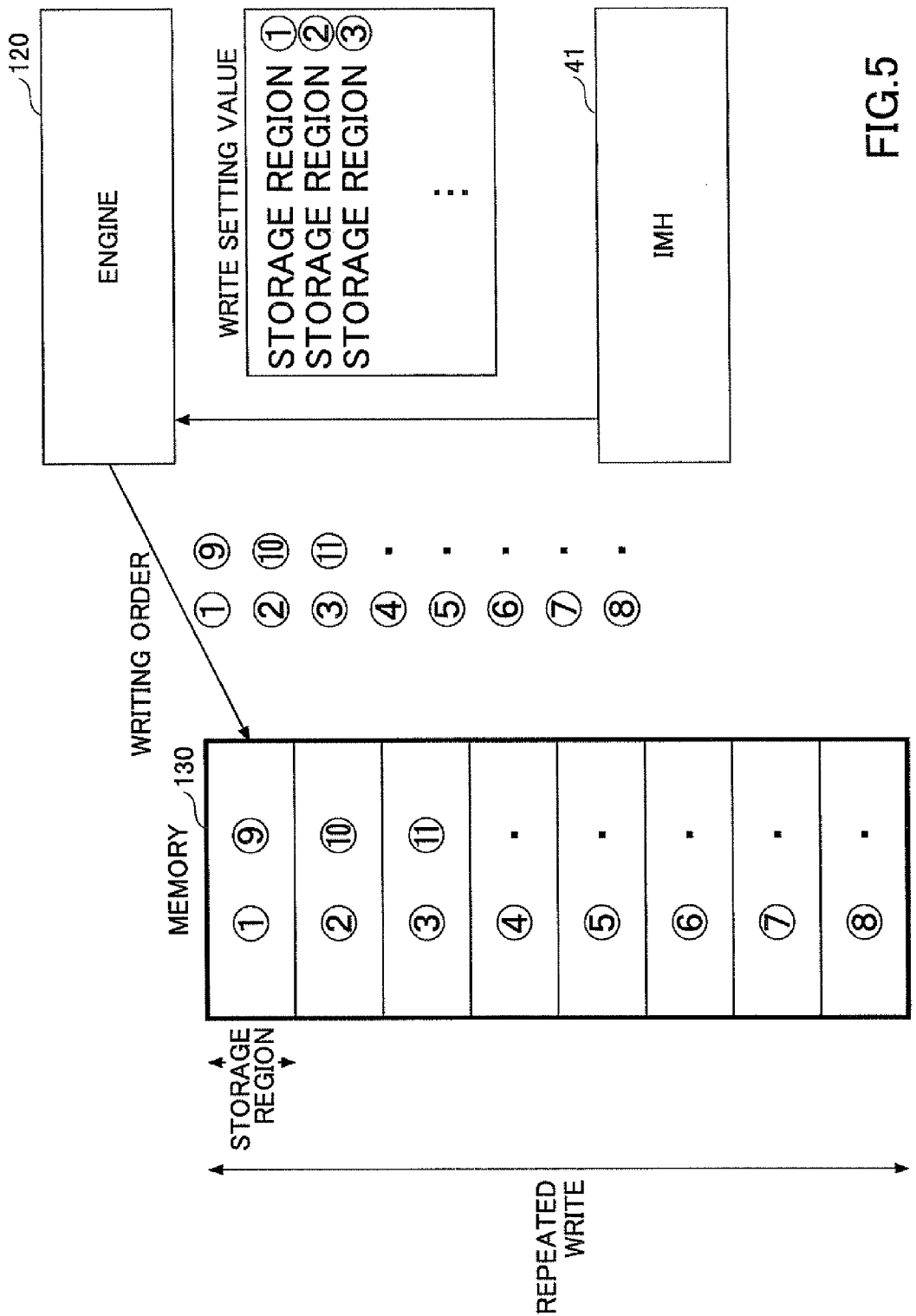
FIG. 5 is a diagram showing an example where an engine directly writes data to a memory.

FIG. 5 is a diagram showing an example where the engine 120 directly writes the data to the memory 130. The engine 120 acquires from the IMH 41 the pointer written with the setting information that is set with the write setting values, and writes the image data in the storage regions of the memory 130 in an order based on the write setting values.

When the image data is written to the storage regions "1" through "8" of the memory 130 in this order, the set storage region in the memory 130 becomes full. The storage regions "1" through "8" are indicated by references numerals "1" through "8" which are encircled by a circular symbol. Hence, the subsequent image data is written to the storage regions "1" through "8" of the memory 130 again in this order, but this time as the storage regions "9" through "16" which are indicated by reference numerals encircled by a circular symbol, until the set storage region in the memory 130 becomes full again. Thereafter, the image data is written to the storage regions "1" through "8" of the memory 130 in this order, repeatedly.

In the example shown in FIG. 5, the memory 130 is segmented into 8 storage regions, and the 8 storage regions are repeatedly used. However, the memory 130 may be segmented into a plurality of regions less than 8 or greater than 8. Furthermore, it is not essential to write the image data in consecutive vacant storage regions of the memory 130. In other words, the write setting values may specify discontinuous vacant storage regions of the memory 130.

Returning now to the description of FIG. 4, the IMH 41 sets all write points, and outputs the setting information to the device driver 140 which controls the hardware resources 4. In addition, the IMH 41 outputs an image data read start instruction, which instructs the start of reading the image data, with respect to the engine 120 via the SRM 39. The engine 120 writes the image data in the memory 130 as shown in FIG. 5 in response to the image data read start instruction.

The device driver 140 includes a point setting unit (or point setting means) 1401, and a detecting unit (or detecting means) 1402. The point setting unit 1401 sets only two check points based on the setting information acquired from the IMH 41.

The detecting unit 1402 detects that the writing by the engine 120 has passed the check point, as the engine 120 writes the image data to the memory 130. In other words, the detecting unit 1402 detects that the image data has been written up to the check point.

The point setting unit 1401 also sets again (or resets) the check point that is detected by the detecting unit 1402, as a next check point.

Figure 6:
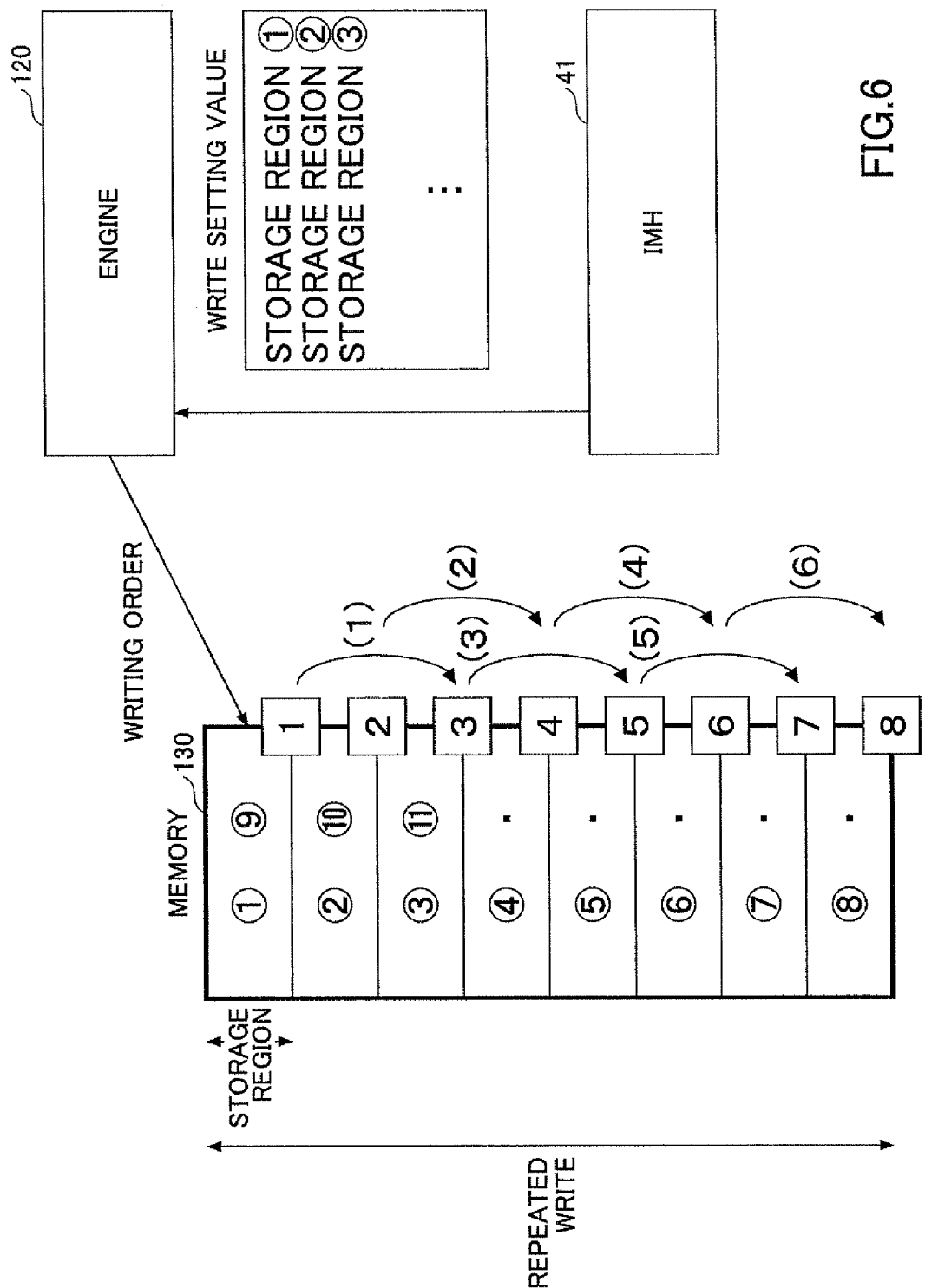
FIG. 6 is a diagram showing an example where a check point is dynamically changed.
Figure 8:
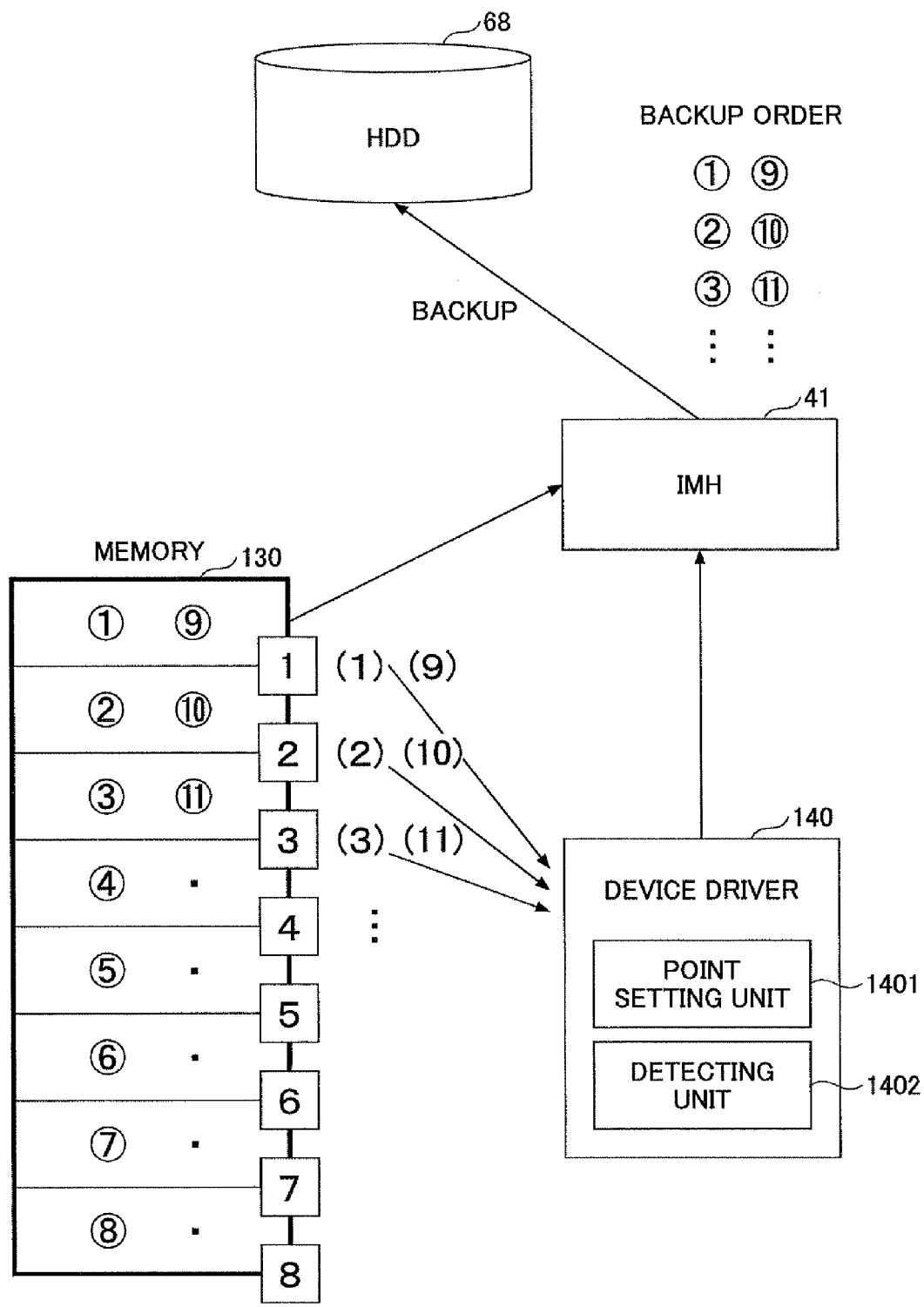
FIG. 8 is a diagram showing an example of an image data backup process for a long image.

Next, a description will be given of the resetting of check point, by referring to FIG. 6. FIG. 6 is a diagram showing an example where the check point is dynamically changed. In FIG. 8, those parts that are the same as those corresponding parts in FIG. 5 are designated by the same reference numerals, and a description thereof will be omitted. As shown in FIG. 6 the image data is written by a process similar to that shown in FIG. 5, but the point setting unit 1401 dynamically sets again (or resets) the check point in FIG. 6.

First, the point setting unit 1401 sets the check points to a check point "1" and a check point "2". The check points "1", "2", . . . are indicated by reference numerals "1", "2", . . . which are encircled by a square symbol and shown along the right edge of the storage regions of the memory 130 in FIG. 6. Then, the detecting unit 1402 detects the end of writing the image data from the engine 120 to the storage region "1" of the memory 130.

Next, before the writing of the image data to the storage region "2" by the engine 120 ends, the point setting unit 1401 resets the check point that is set at the check point "1" as a check point "3" of a vacant storage region.

Similarly thereafter, the check point that is set at the check point "2" is reset as a check point "4", and the check point that is set at the check point "3" is reset as a check point "5". Therefore, two check points are reset with respect to the storage regions of the memory 130, so as to be alternately detected by the detecting unit 1402.

In other words, the check point that is initially set at the check point "1" is reset as check points "1", "3", "5" and "7" in this order, and the check point that is initially set at the check point "2" is reset as check points "2", "4", "6" and "8" in this order. Consequently, the data write to write the image data to the memory 130 becomes possible when two valid check points are set.

Returning now to the description of FIG. 4, the detecting unit 1402 detects that the writing by the engine 120 has passed the check point, every time the writing by the engine 120 passes the check point, and notifies the passing of the check point detected by the detecting unit 1402 to the backup processing unit 412. The backup processing unit 412 backs up the image data in the storage region corresponding to the detected check point into the HDD 68 in response to this notification received from the detecting unit 1402.

Figure 7:
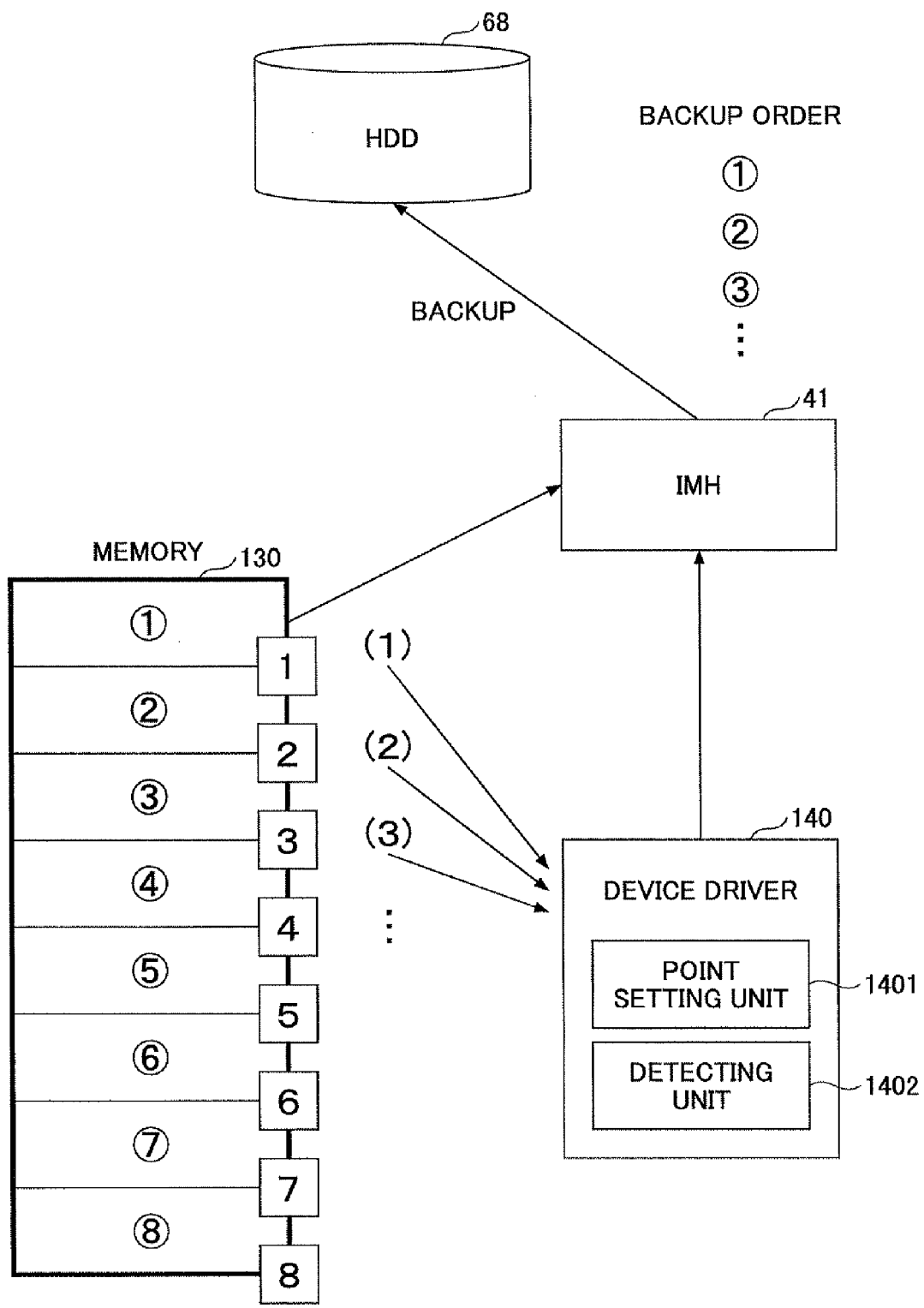
FIG. 7 is a diagram showing an example of an image data backup process.

FIG. 7 is a diagram showing an example of an image data backup process. In FIG. 7, those parts that are the same as those corresponding parts in FIG. 5 are designated by the same reference numerals, and a description thereof will be omitted. The image data backup process shown in FIG. 7 is carried out on a precondition that processes similar to those shown in FIGS. 5 and 6 are carried out. As shown in FIG. 7, the detecting unit 1402 detects the check point that is set as shown in FIG. 6, and notifies the detected check point to the IMH 41.

The IMH 41 successively backs up the image data stored in the storage regions (of the memory 130) corresponding to the notified check points into the HDD 68. In the example shown in FIG. 7, the image data stored in the storage regions "1", "2", "3", . . . corresponding to the notified check points "1", "2", "3", . . . are successively backed up into the HDD 68 in this order.

FIG. 8 is a diagram showing an example of an image data backup process for a long image which cannot be stored in its entirety within the limited storage capacity of the memory 130. In FIG. 8, those parts that are the same as those corresponding parts in FIG. 5 are designated by the same reference numerals, and a description thereof will be omitted. Basically, the IMH 41 backs up the image data in the order of the notified check points as shown in FIG. 7. But in the example shown in FIG. 8, the storage regions of the memory 130 are repeatedly used because the image data is related to the long image. Hence, in the example shown in FIG. 8, the image data stored in the storage regions "1", "2", "3", . . . corresponding to the notified check points "1", "2", "3", . . . are successively backed up into the HDD 68 in this order, and the image data stored in the storage regions "1", "2", "3", . . . which are reset as the storage regions "9", "10", "11", . . . and corresponding to the notified check points "1", "2", "3", . . . are successively backed up into the HDD 68 in this order, and the image data backup process is carried out similarly thereafter.

In this case shown in FIG. 8, the check point that is initially set as the check point "1" is successively set as the check points "2", "3", "5", "7", "1", "3", . . . in this order, and the check point "2" that is initially set as the check point "2" is successively set as the check points "2", "4", "6", "8", "2", "4", . . . in this order.

Next, a description will be given of a case where the image data is a color image data related to a color image which cannot be stored in its entirety within the limited storage capacity of the memory 130.

In the case of the color image data, the engine 120 simultaneously writes the image data of each of the colors cyan (C), magenta (M), yellow (Y) and black (K). As a result, the detecting unit 1402 of the device driver 140 may simultaneously detect a plurality of check points.

The IMH 41 backs up the image data of each of the colors C, M, Y and K in response to the notification from the device driver 140 notifying that the writing by the engine 120 has passed the check point. However, because there is only one HDD 68, the image data backup process for each of the colors C, M, Y and K are put into a queue.

Because the image data backup processes of the colors C, M, Y and K are queued, the storage region of the memory 130 to which the engine 120 writes the image data may become the same as the storage region which stores the image data that is being backed up into the HDD 68, before the image data to be backed up into the HDD 68 is completely backed up into the HDD 68. For this reason, the transfer speed (or transfer rate) of the HDD 68 needs to be at least higher than the write speed (or write rate) of the engine 120.

Figure 9:
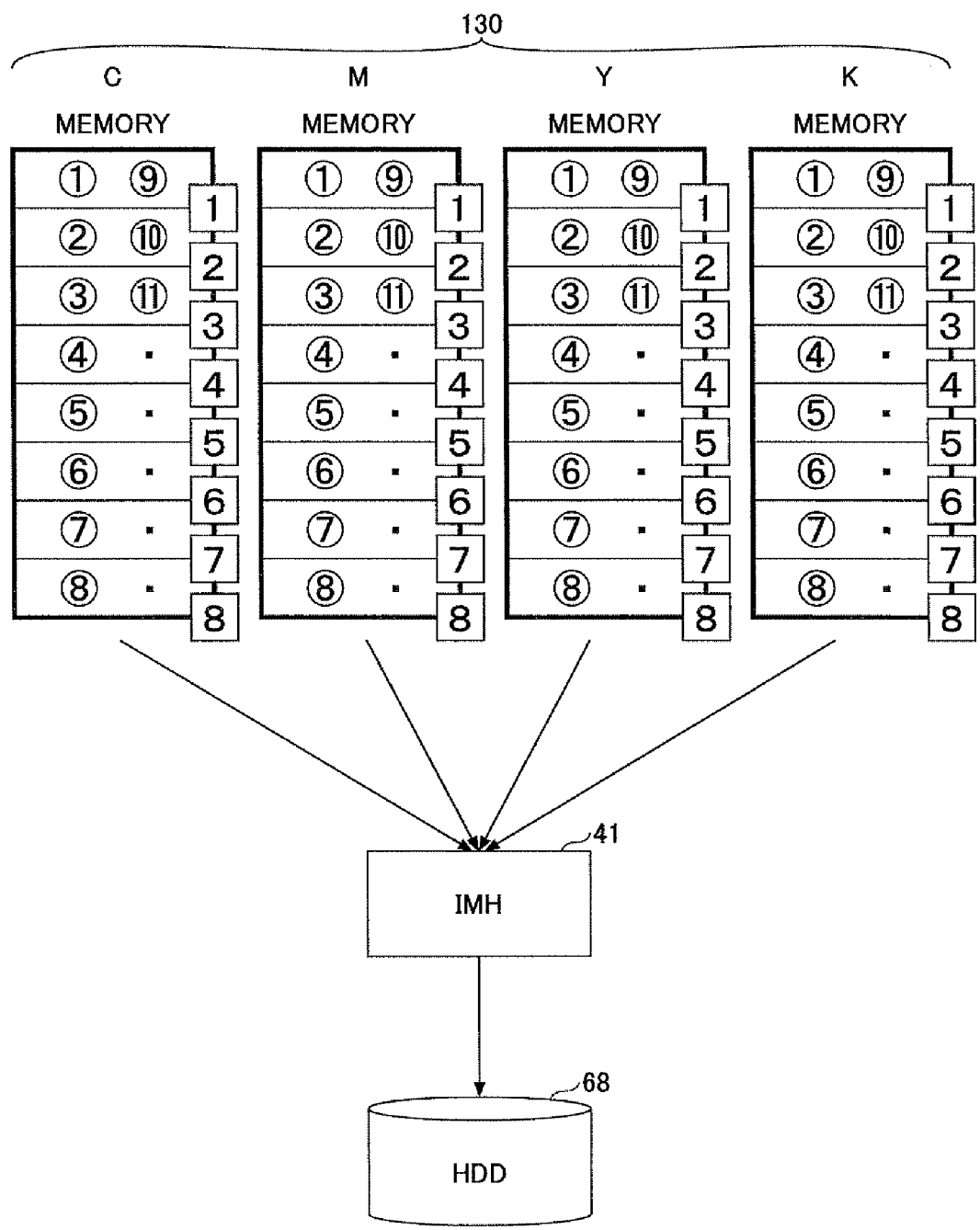
FIG. 9 is a diagram showing an example of an image data backup process for a long color image.

Next, a description will be given of a case where the color image data is related to a long color image, by referring to FIG. 9. FIG. 9 is a diagram showing an example of an image data backup process for the long color image. In FIG. 9, those parts that are the same as those corresponding parts in FIG. 5 are designated by the same reference numerals, and a description thereof will be omitted.

As shown in FIG. 9, the IMH 41 attempts to back up the image data of each of the colors C, M, Y and K from the storage regions of the memory 130 for each of the colors C, M, Y and K into the HDD 68 in response to a notification from the detecting unit 1402 notifying that the writing by the engine 120 has passed the check point, that is, notifying that the image data up to the check point has been stored.

In this state, no inconveniences will occur if the transfer speed (or transfer rate) of the HDD 68 is higher than the write speed (or write rate) of the engine 120 as described above. However, if the transfer speed of the HDD 68 becomes the write speed of the engine 120 or lower, the transfer of the image data to the HDD 68 may be delayed.

If such a delay should occur, and it is not possible to eliminate the delay in the backup of the image data from a certain storage region of the memory 130 into the HDD 68 by the time the engine 120 writes the image data to this certain storage region of the memory 130, it is necessary to generate an alarm or the like to notify the operator of the error or abnormality generated during the image data backup process.

FIG. 10 is a diagram showing an example of an abnormal condition table. As shown in FIG. 10, two abnormal conditions are set in this example. A condition C1 judges an abnormality when the next backup request is received before the image data backup process ends with respect to each of the colors C, M, Y and K.

With regard to the condition C1, if the detecting unit 1402 detects the end of writing the image data with respect to the next storage region of the memory 130 even though the image data backup process has not ended, it means that a delay is generated in the image data backup process. Such a state may occur in the MFP 1 in which a plurality of applications operate simultaneously.

However, even if the delay is generated in the image data backup process under the condition C1, the image data does not immediately become an abnormal image. Hence, in this case, an abnormality generated during operation is notified to the operator by displaying an alarm or the like on the operation panel 70 by generating an alarm display request.

On the other hand, a condition C2 judges an abnormality when a backup request is received with respect to a storage region of the memory 130 immediately preceding the target storage region for which the image data backup process is being carried out, before the image data backup process ends with respect to each of the colors C, M, Y and K.

With regard to the condition C2, if the detecting unit 1402 detects the end of writing the image data with respect to the storage region of the memory 130 immediately preceding the target storage region for which the image data backup process is being carried out even though the image data backup process has not ended, the engine 120 will write the image data to the storage region of the memory 130 for which the image data backup process is being carried out. As a result, image data may be overwritten on the image data that is stored in the storage region of the memory 130 and is being backed up into the HDD 69.

In other words, when the writing of the image data to the storage regions of the memory 130 completes one round and the image data is to be written to the same storage regions of the memory 130 in the second round, an abnormality is judged according to the condition C2 if the image data backup process has not ended with respect to the previous image data. In the case of the abnormality judged according to the condition C2, an abnormal image in which a portion of the image repeats at a specific period is generated.

Therefore, if the abnormality according to the condition C2 is generated, an abnormality generated during operation is notified to the operator by displaying an alarm or the like on the operation panel 70 by generating an alarm display request, and further, the abnormal image is prevented from being generated by carrying out a process such as stopping the writing of the image data to the storage regions of the memory 130 by generating a process stop request.

In addition, the condition table shown in FIG. 10 may be held within the IMH 41 for use in judging the abnormality described above. In this case, the IMH 41 may judge whether the condition included in the condition table is satisfied with respect to the check points notified from the device driver 140, in order to judge the abnormality that is generated.

Figure 11:
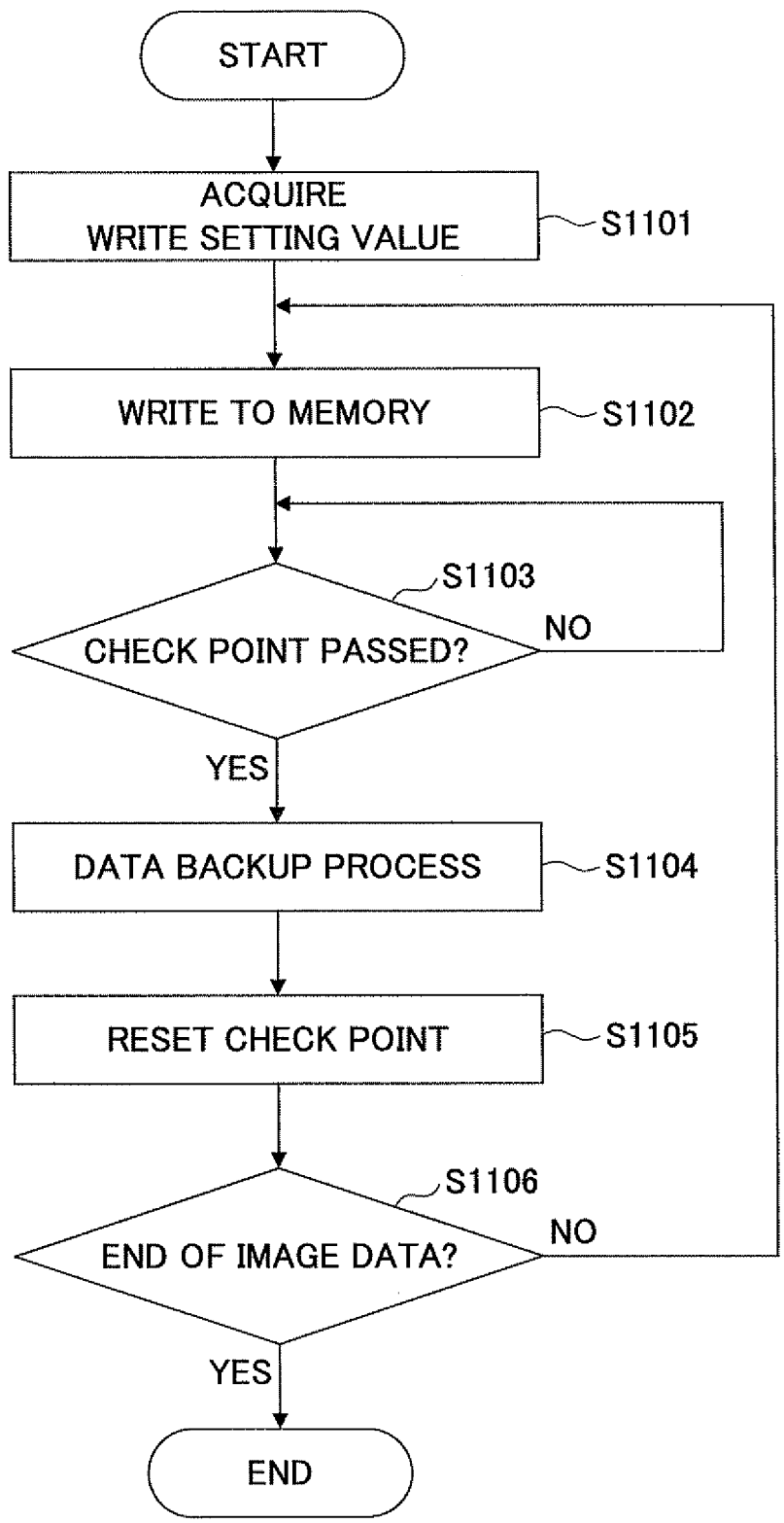
FIG. 11 is a flow chart for explaining an example of a process related to a data write of the MFP in the embodiment.

FIG. 11 is a flow chart for explaining an example of a process related to a data write of the MFP 1 in this embodiment. In a step S1101 shown in FIG. 11, the engine 120 acquires the write setting values of the information related to the writing of the image data from the IMH 41 to the memory 130. In a step S1102 which follows the step S1102, the engine 120 writes the image data to the memory 130 in units of the storage regions, based on the write setting values.

In a step S1103 following the step S1102, the detecting unit 1402 detects whether the writing by the engine 120 has passed the check point that is set with respect to the storage region of the memory 130. The step S1103 is repeated if the detection result in the step S1103 is NO. If the detection result in the step S1103 is YES, the detecting unit 1402 notifies the detection to the IMH 41, and the process advances to a step S1104. In the step S1104, the IMH 41 carries out the image data backup process.

The image data backup process of the IMH 41 is as described above with reference to FIGS. 7 through 9. In other words, if the writing by the engine 120 has passed the check point, the image data in the storage region of the memory 130 corresponding to this check point is backed up into the HDD 68.

In a step S1105 which follows the step S1104, the point setting unit 1401 resets the position of the check point. The position of the check point is reset in the manner described above so that two check points are alternately detected by the detecting unit 1402. The process of the step S1105 is carried out even if the process of the step S1104 does not end.

In a step S1106 which follows the step S1105, the engine 120 judges whether all of the image data to be written to the memory 130 have been written. If the judgement result in the step S1106 is NO, the process returns to the step S1102. On the other hand, the process ends if the judgement result in the step S1106 is YES.

Therefore, according to the MFP 1 of this embodiment, an engine automatically acquires a storage region of a memory where the image data is to be written in order to efficiently utilize the memory, even when the image data is related to a long image or a color image.

In addition, by carrying out a suitable image data backup process with respect to the image data related to the long image or the color image, it is possible to efficiently utilize the limited storage capacity of the memory.

Moreover, it is possible to prevent an abnormal image from being generated by judging whether an abnormality is generated during the image data backup process or the data write, when carrying out the image data backup process using two check points.

Of course, the processing contents of the embodiment described above may be instructed by a program, and the program may be stored in a suitable computer-readable storage medium. In other words, the program which, when executed by a computer, may cause the computer to perform processes to realize the processing contents of the embodiment described above. More particularly, the program may cause the computer of the image forming apparatus, such as the CPU of the MFP, to execute the processes of the embodiment described above.

This application claims the benefit of a Japanese Patent Application No. 2008-173504 filed on Jul. 2, 2008, in the Japanese Patent Office, the disclosure of which is hereby incorporated by reference.

Further, the present invention is not limited to these embodiments, but various variations and modifications may be made without departing from the scope of the present invention.

What is claimed is:

1. An image forming apparatus comprising:
    a read unit configured to read a document image and to generate image data of the document image;
    a memory management unit configured to manage a single first storage unit which is segmented into N storage regions, where N is an even number greater than or equal to 4, and to provide setting information related to writing of the image data to the first storage unit;
    an engine configured to acquire the setting information from the memory management unit, and to write the image data generated by the read unit to the first storage unit based on the setting information;
    a point setting unit configured to set a first check point to an end of an ith storage region and a second check point to an end of an (i+1)th storage region of the first storage unit based on the setting information, where i is a natural number from 1 to N−1;
    a detecting unit configured to detect writing of the image data up to each of the first and second check points set by the point setting unit, in order to detect each of the first and second check points; and
    a backup processing unit configured to back up the image data written in the first storage unit into a second storage unit in units of the plurality of storage regions of the first storage unit by a backup process, when the detecting unit detects the writing of the image data up to one of the first and second check points set by the point setting unit,
    wherein the backup processing unit generates an alarm display request that requests display of an alarm when the detecting unit detects the writing of the image data up to a next check point that is set by the point setting unit in a state in which the backup process of the backup processing unit has not ended,
    wherein the point setting unit dynamically resets the first check point to the end of an (i+2)th storage region that is vacant when the detecting unit detects the first check point at the end of the ith storage region and before the detecting unit detects the second check point at the end of the (i+1)th storage region,
    wherein the point setting unit dynamically resets the second check point to the end of an (i+3)th storage region that is vacant when the detecting unit detects the second check point at the end of the (i+1)th storage region and before the detecting unit detects the first check point at the end of the (i+2)th storage region, so that the first check point and the second check point are alternately detected by the detecting unit, and
    wherein the first and second check points that are set or dynamically reset exist simultaneously.

2. The image forming apparatus as claimed in claim 1, wherein the backup processing unit generates a process stop request when the detecting unit detects the writing of the image data up to a check point that is set by the point setting unit with respect to a storage region immediately preceding a target storage region for which the backup process is being carried out in a state in which the backup process of the backup processing unit has not ended.

3. The image forming apparatus as claimed in claim 1, wherein the image data relates to a long image which cannot be stored in its entirety within the first storage unit.

4. The image forming apparatus as claimed in claim 1, wherein the image data relates to a color image which cannot be stored in its entirety within the first storage unit.

5. A memory control method for an image forming apparatus comprising a read unit configured to read a document image and to generate image data of the document image, a memory management unit configured to manage a single first storage unit which is segmented into N storage regions, where N is an even number greater than or equal to 4, and an engine configured to write the image data generated by the read unit to the first storage unit, the memory control method comprising:
    acquiring, by the engine, setting information related to writing of the image data, from the memory management unit;
    writing, by the engine, the image data to the first storage unit based on the setting information that is acquired by the acquiring;
    setting a first check point to an end of an ith storage region and a second check point to an end of an (i+1)th storage region of the first storage unit based on the setting information, where i is a natural number from 1 to N−1;
detecting writing of the image data up to each of the first and second check points set by the setting, in order to detect each of the first and second check points; and
backing up the image data written in the first storage unit into a second storage unit in units of the plurality of storage regions of the first storage unit by a backup process, when the detecting detects the writing of the image data up to one of the first and second check points set by the setting,
wherein the backing up generates an alarm display request that requests display of an alarm when the detecting detects the writing of the image data up to a next check point that is set by the setting in a state in which the backup process has not ended,
wherein the setting dynamically resets the first check point to the end of an (i+2)th storage region that is vacant when the detecting detects the first check point at the end of the ith storage region and before the detecting detects the second check point at the end of the (i+1)th storage region,
wherein the setting dynamically resets the second check point to the end of an (i+3)th storage region that is vacant when the detecting detects the second check point at the end of the (i+1)th storage region and before the detecting detects the first check point at the end of the (i+2)th storage region, so that the first check point and the second check point are alternately detected by the detecting, and
wherein the first and second check points that are set or dynamically reset exist simultaneously.

6. The memory control method as claimed in claim 5, wherein the backing up generates a process stop request when the detecting detects the writing of the image data up to a check point that is set by the setting with respect to a storage region immediately preceding a target storage region for which the backup process is being carried out in a state in which the backup process has not ended.

7. The memory control method as claimed in claim 5, wherein the image data relates to a long image which cannot be stored in its entirety within the first storage unit.

8. The memory control method as claimed in claim 5, wherein the image data relates to a color image which cannot be stored in its entirety within the first storage unit.

9. A non-transitory computer-readable storage medium on which a program which, when executed by a computer, causes the computer to perform a process comprising:
reading a document image and generating image data of the document image;
managing a single first storage unit which is segmented into N storage regions, where N is an even number greater than or equal to 4, and providing setting information related to writing of the image data to the first storage unit;
acquiring the setting information from the managing, and writing the image data generated by the reading to the first storage unit based on the setting information;
setting a first check point to an end of an ith storage region and a second check point to an end of an (i+1)th storage region of the first storage unit based on the setting information, where i is a natural number from 1 to N−1;
detecting writing of the image data up to each of the first and second check points set by the setting, in order to detect each of the first and second check points; and
backing up the image data written in the first storage unit into a second storage unit in units of the plurality of storage regions of the first storage unit by a backup process, when the detecting detects the writing of the image data up to one of the first and second check points set by the setting,
wherein the backing up generates an alarm display request that requests display of an alarm when the detecting detects the writing of the image data up to a next check point that is set by the setting in a state in which the backup process has not ended,
wherein the setting dynamically resets the first check point to the end of an (i+2)th storage region that is vacant when the detecting detects the first check point at the end of the ith storage region and before the detecting detects the second check point at the end of the (i+1)th storage region,
wherein the setting dynamically resets the second check point to the end of an (i+3)th storage region that is vacant when the detecting detects the second check point at the end of the (i+1)th storage region and before the detecting detects the first check point at the end of the (i+2)th storage region, so that the first check point and the second check point are alternately detected by the detecting, and
wherein the first and second check points that are set or dynamically reset exist simultaneously.

10. The image forming apparatus as claimed in claim 1,
wherein the point setting unit dynamically sets the first check point to the end of a first storage region that is vacant when the detecting unit detects the first check point at the end of a (N−1)th storage region and before the detecting unit detects the second check point at the end of an Nth storage region, and
wherein the point setting unit dynamically sets the second check point to the end of a second storage region that is vacant when the detecting unit detects the second check point at the end of the Nth storage region and before the detecting unit detects the first check point at the end of the (N−1)th storage region.

11. The memory control method as claimed in claim 5,
wherein the setting dynamically sets the first check point to the end of a first storage region that is vacant when the detecting detects the first check point at the end of a (N−1)th storage region and before the detecting detects the second check point at the end of an Nth storage region, and
wherein the setting dynamically sets the second check point to the end of a second storage region that is vacant when the detecting detects the second check point at the end of the Nth storage region and before the detecting detects the first check point at the end of the (N−1)th storage region.

12. The non-transitory computer-readable storage medium as claimed in claim 9,
wherein the setting dynamically sets the first check point to the end of a first storage region that is vacant when the detecting detects the first check point at the end of a (N−1)th storage region and before the detecting detects the second check point at the end of an Nth storage region, and
wherein the setting dynamically sets the second check point to the end of a second storage region that is vacant when the detecting detects the second check point at the end of the Nth storage region and before the detecting detects the first check point at the end of the (N−1)th storage region.

13. The non-transitory computer-readable storage medium as claimed in claim 9, wherein the backing up generates a process stop request when the detecting detects the writing of the image data up to a check point that is set by the setting with respect to a storage region immediately preceding a target storage region for which the backup process is being carried out in a state in which the backup process has not ended.

14. The non-transitory computer-readable storage medium as claimed in claim 9, wherein the image data relates to a long image which cannot be stored in its entirety within the first storage unit.

15. The non-transitory computer-readable storage medium as claimed in claim 9, wherein the image data relates to a color image which cannot be stored in its entirety within the first storage unit.

\* \* \* \* \*